Aug. 15, 1967  T. G. SHAND ETAL  3,335,469
PERSONAL SAFETY EQUIPMENT
Filed Nov. 17, 1964  3 Sheets-Sheet 3
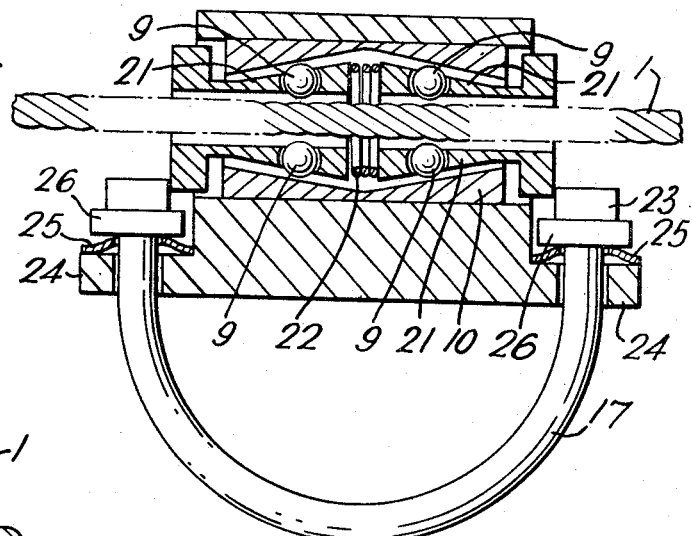
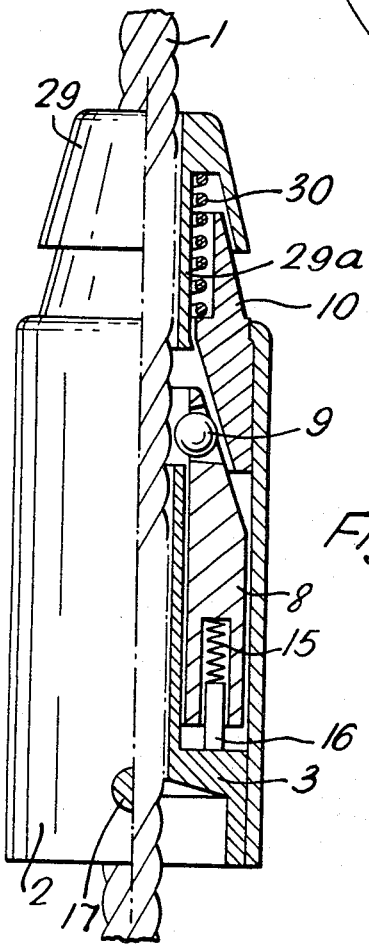

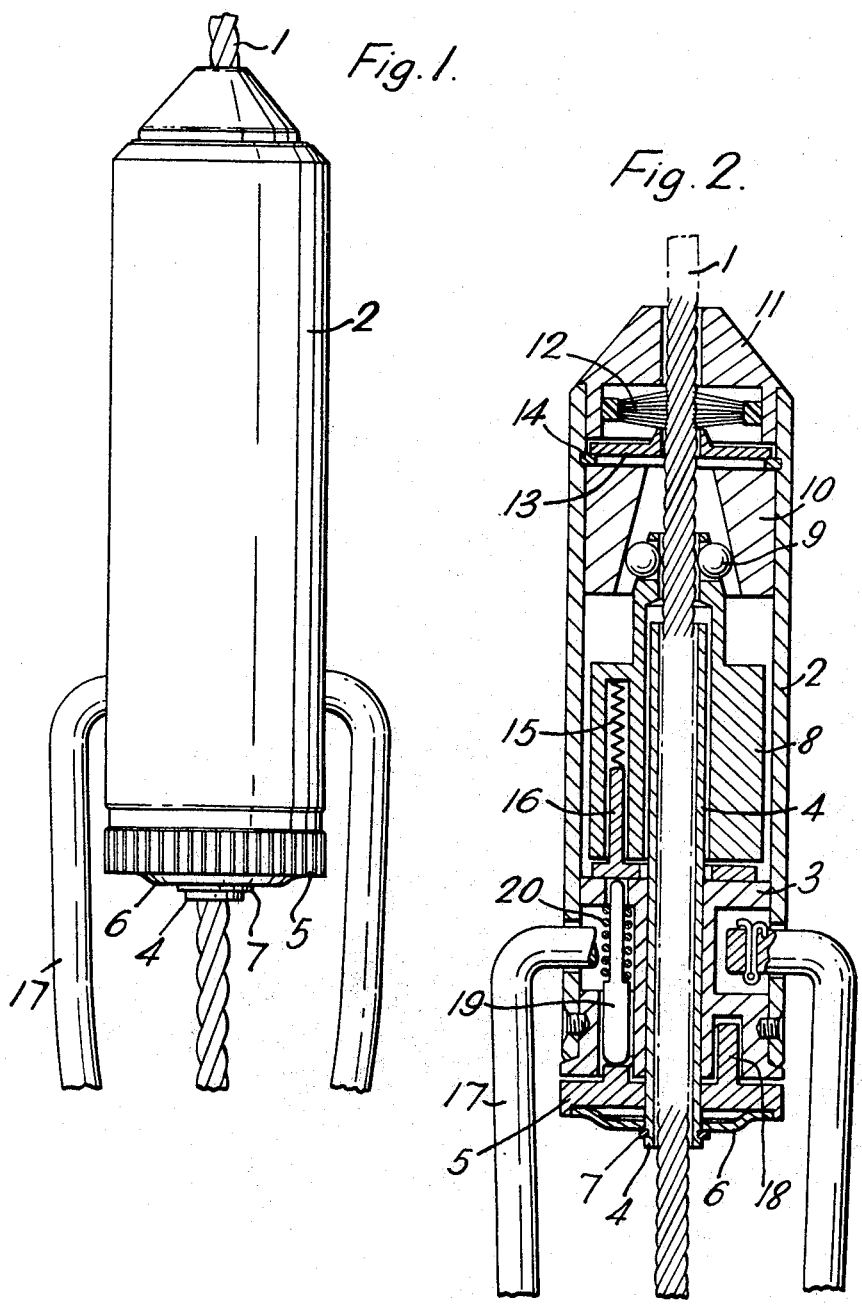

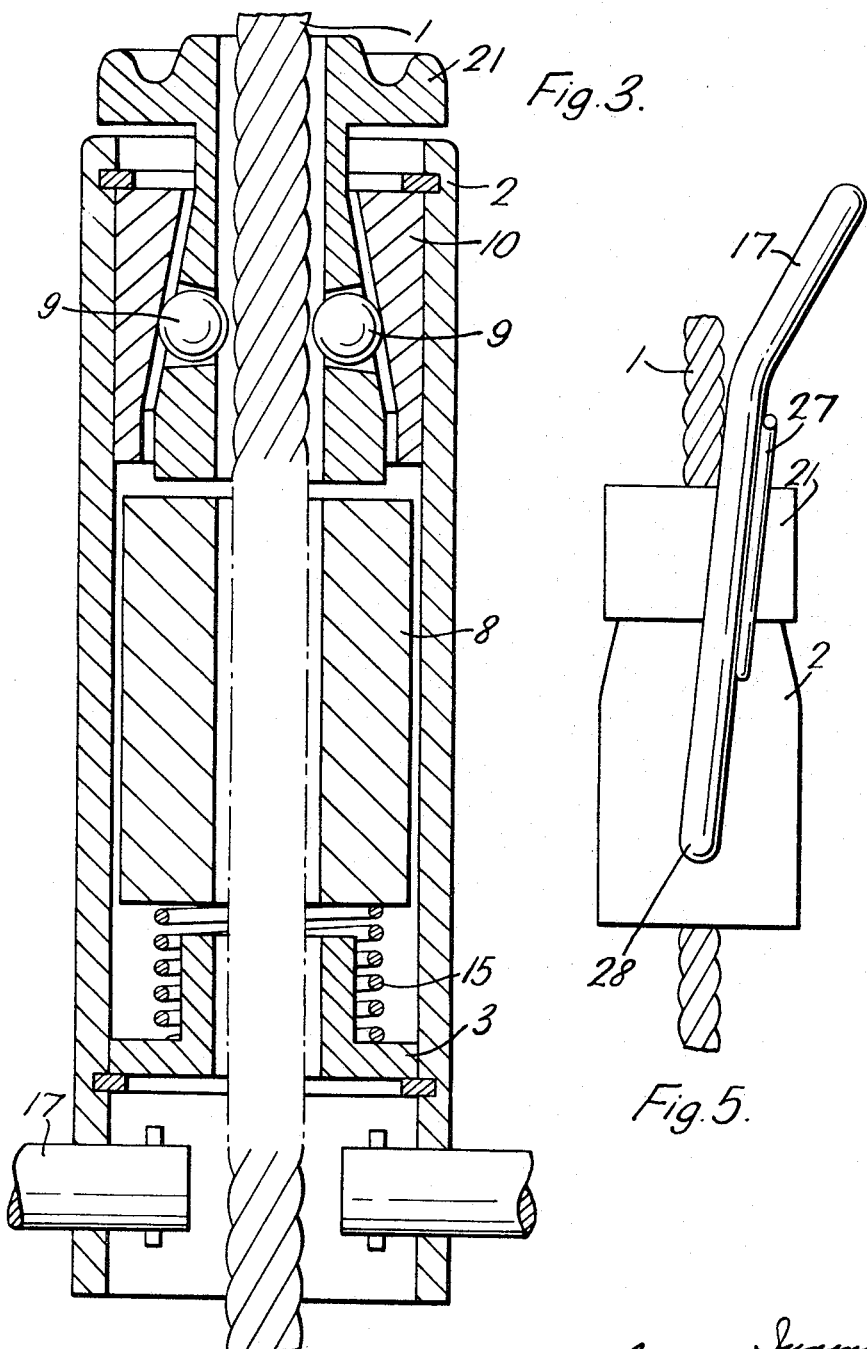

United States Patent Office 3,335,469
Patented Aug. 15, 1967

3,335,469
PERSONAL SAFETY EQUIPMENT
Thomas George Shand, Hatch End, and Alexander Kenneth Clyde, Shirley, England, assignors to Barrow Hepburn & Gale Limited, London, England, a British company
Filed Nov. 17, 1964, Ser. No. 411,849
Claims priority, application Great Britain, Nov. 19, 1963, 45,659/63
6 Claims. (Cl. 24—126)

This invention relates to personal safety devices for use by workers at height.

A conventional form of safety equipment for use by personnel exposed to the risk of falling from considerable height comprises a personal safety belt or harness to which one end of a safety line is attached, the other end of the safety line being provided with a safety hook which can be engaged with a fixed anchorage. This equipment is satisfactory so long as a suitable fixed anchorage is available, but very often it is not and there is always a risk of a fall occurring when moving the safety line from one anchorage point to another.

Safety equipment comprising a safety block which can be connected to a fixed anchorage and comprises a wound cable which can be pulled out from the block as required, against spring pressure, is also known. The end of the cable can be attached to a personal safety belt. In the event of a sudden load on the cable the cable sheave is locked. This equipment has the advantage that the user is permitted considerable freedom of movement without it being necessary to shift the safety block. However the equipment is cumbersome and expensive.

A further type of safety equipment which has been proposed for use on high ladders comprises a tube fixed to the ladder and a sleeve which is slidably mounted on the ladder and has a catch device which can be connected to a personal safety belt and operates to engage one of a series of notches on the tube in the event of the user falling. This form of safety equipment does not permit even normal descent of the user unless the catch is held or locked open and the operation of this equipment is liable to be seriously impaired with consequent danger to life, if the tube is not kept clean.

The present invention provides safety equipment in the form of a mobile safety anchor comprising a runner through which a safety line can be threaded and which has means for connecting it to a safety belt, said runner housing line-gripping members for gripping a said safety line, wedge means for wedging said line-gripping members against a said line, and a part freely movable axially within said runner and operative by its inertia to relatively displace said wedge means and gripping members into line-gripping position on rapid acceleration of the runner from rest in a predetermined direction along a said line.

The line-gripping members are preferably constituted by balls. These balls may be carried by a cage separate from the freely movable part responsible for the initiation of the locking action or this freely movable part may itself carry the balls. Preferably there are at least three angularly spaced balls which are forced radially inwards agains the safety line by the wedge means in the event of fall of a person attached to the runner.

It is not excluded that the balls or other line-gripping members may normally lie in contact with the safety line when such a line is threaded through the runner provided they do not effectively grip the safety line until the gripping members and wedge means are relatively displaced.

The wedge means is preferably fast with the body of the runner but it is possible to construct the anchor so that the locking of the anchor onto the safety line takes place by displacement of the wedge means relatively to the runner body and the line-gripping members.

Instead of constructing the anchor device as above defined for operation on an inertia principle, the runner may have wedge means for wedging line-gripping members against a safety line threaded through the runner, means for coupling the runner to a safety belt, and means responsive to displacement of this coupling means under load for relatively moving the line-gripping members and the wedge means into line-gripping position. As a still further alternative the line-gripping members may normally be held in line-gripping position, e.g. by spring means, the anchor device being provided with a grip releaser which can be operated for temporarily freeing the runner. The invention includes, by way of modifications, safety anchors having these features. By way of example, the means for coupling the runner to a safety belt may comprise a ring pivoted to the runner and this ring may be movable when loaded as by fall of a person attached thereto, into a position in which it releases a spring which relatively displaces the wedge means and line-gripping members.

The safety line is preferably in the form of a wire rope, but it can alternatively be, e.g., in the form of a rail or rod depending on the field of use.

While reference has been made to attachment of the runner to a safety belt it may of course be attached to any other similar type of personal safety equipment worn by a user, e.g. a safety harness, and the attachment may be direct or through a rope or other line.

The main field of application of the invention is safety equipment for use by spidermen or others requiring protection while at work on high structures and during ascent and descent, e.g., during ascent and descent of high ladders. In such cases the safety line will be secured in a vertical or steeply inclined position. The safety line may for example be a cable freely suspended from a high anchorage point. In that case a workman wearing a safety belt or safety harness attached to the runner will be able to move up and down and over appreciable distances at any given level and the great advantage is realised, due to the invention, that at no time during such movements need the safety line anchorage be shifted or the worker's connection to the safety line be released, and in the event of a fall the runner grips the safety line without any substantial displacement therealong as soon as a sudden pull is exerted on the runner due to the fall. The runner is preferably connected to the safety belt or harness directly or by a short flexible line so that the free-fall distance before the worker is arrested to practically nil.

For high ladder work, the safety line, e.g. in the form of a rod or rail or a flexible cable may be secured to top and bottom anchorages on or adjacent the ladder, preferably at one side thereof in the position often occupied by a hand-rail. The safety line, with the runner thereon, can remain in place as a permanent installation ready for use by a workman as soon as he reaches the ladder; he has merely to clip his belt or harness onto the connecting means on the runner. Such connecting means may, e.g., take the form of a metal ring, in which case it suffices for the safety belt or harness to be equipped with a hook with a safety latch device.

An alternative field of application of the invention is safety equipment for use by workers requiring a horizontally suspended safety line. Particularly in that field, several runners may be provided to the one safety line so that several workers may be attached thereto. In such cases each runner is preferably normally freely displaceable along the safety line but grips the line in the event of a fall. For use with a "horizontal" safety line, the alternative type of runner construction above defined is particularly suitable.

Four different embodiments of the invention will now be described with reference to the accompanying diagrammatic drawings.

FIGURES 1 and 2 are external and longitudinal sectional elevations of one runner construction; FIGURES 3 and 4 are longitudinal sectional elevations of two further runner constructions; FIGURE 5 is an external elevation of a third type of runner and FIGURE 6 is a half sectional elevation of a fourth type of runner. Each figure shows part of the associated safety line.

In the drawings figures illustrating different forms of the safety anchor, parts corresponding in function are denoted by like reference numerals.

Referring first to FIGURES 1 and 2, the equipment which is the subject of these figures is intended for use with the cable 1 suspended vertically or at a steep inclination, e.g., along a sloping roof. The runner, through which the cable is threaded comprises a tubular body 2 into the lower end of which a block 3 is secured. A guide tube 4 fixed through a central bore of the block 3 extends upwardly into the interior of the body 2. The lower end of the guide tube extends a little below the block 3 and a disc 5 is rotatably supported on this guide tube by means of a cap piece 6 marginally secured to the disc 5 and held against axial displacement along the guide tube by a collar 7 on such tube.

Above the block 3 is a loose tubular weight 8 which at its upper end forms a cage for three steel balls 9 disposed at 120° intervals around the axis of the cable 1, and above the said weight is a conical wedge member 10 which is secured within the body 2 of the runner. At the top of the runner is a cap 11 with a skirt portion which is plugged into the body 2. This skirt portion supports a series of nylon filaments projecting radially inwards around the cable and form a brush 12 which cleans the cable in the course of use. The brush occupies a relatively shallow chamber defined by the top cap 11 and a disc 13 supported on an internal ring 14 let into a groove on the inside of the runner body 2.

The weight 8 rests on six stainless steel springs 15 (only one of which is apparent in FIGURE 2) evenly spaced around the axis of the runner. These springs are carried by pins 16 with enlarged base portions which rest on the block 3, the pin stems and the springs located thereon being accommodated within cylindrical bores within the weight.

The runner can be coupled to a safety belt by a D-ring 17 which is pivotally connected to the runner.

The device functions as follows. If the user climbs the structure from which the cable 1 is suspended the runner affords no resistance. The runner slides freely along the cable 1. Also if the user descends the structure normally, the runner offers no resistance. However, should the user fall, a sudden force is applied to the D-ring 17 and the body of the runner rapidly accelerates downwardly. Due to its inertia, the loose weight 8 lags behind and moves the steel balls 9 against the conical face of the wedge member 10. The balls are thereby forced inwards against the cable and powerfully grip it.

Once the balls grip the cable, the magnitude of the gripping force increases with the load. The amount of compression of the cable by the balls is such that the runner slides down the cable for a few inches before finally stopping the fall. In this way the shock of the fall on the person is reduced.

Once the load on the runer is relieved and the runner is raised the grip on the cable by the balls relaxes.

The bottom disc 5 is formed with a sloping annular flange 18 forming a cam. If it is desired to hold the runner locked on the cable at any time, this can be done by turning the disc 5 so that the cam 18 raises a pin 19 within the block 3 against the action of a surrounding helical spring 20. As the upper end of pin 19 advances from the top of the block 3 the pin presses upwardly on the base of one of the pins 16 and raises the weight 8 into locking position.

The guide tube 4 serves to straighten any kinks which may be present in the cable, during the movement of the runner therealong.

The unit shown in FIGURE 3 functions in a similar way to the unit shown in FIGURES 1 and 2 but in the FIGURE 3 unit the ball cage is formed by a component 21 which is separate from the weight 8 and extends through the top of the runner body forming a cap portion. If it is at any time desired to render the inertia lock temporarily inoperative this can be done by holding this cap portion pressed down onto the runner body so that the weight 8 cannot displace the balls into engagement with the wedge 10.

The unit shown in FIGURE 4 is intended for use with the cable 1 in a horizontal or inclined position, anchored at both ends. The body 2 of the runner accommodates a wedge component 10 providing two conical wedges and there are two ball cages 21 each accommodating a series of steel balls 9. A spring 22 is located between the two cages and urges them outwardly but in the normal way the cages are held in their illustrated inward positions by the ends 23 of the D-ring 17 which extend with clearance through lugs 24 on the body 2 of the runner. Belleville spring washers 25 mounted between the lugs 24 and collars 26 on the D-ring 17 serve to hold the D-ring in the illustrated position. In this position, the runner can move freely along the cable in either direction. In the event that a worker attached to the D-ring 17 falls, the ring is pulled downwards against the force exerted by the spring washers 25 so that the ball cages 21 are released and spring outwardly in opposite directions under the action of spring 22, so causing the balls 9 to become wedged firmly against the cable. Consequently the runner is locked.

FIGURE 5 shows an alternative type of runner for a vertical cable. The constructional details are not shown. The runner comprises a conical wedge and locking-balls but functions as does the runner shown in FIGURE 4 without the inertia principle. In the same way as in the unit shown in FIGURE 3 the ball cage 21 also forms an external cap portion. In the FIGURE 5 unit this cage 21 is urged upwardly by an internal spring and in normal use is held depressed against the action of this spring, by a locking member 27 which is connected to the D-ring 17. This D-ring is pivoted to the runner body 2 at 28 and in normal use is held in the illustrated position by the force exerted against the locking member 27 by the ball cage under the action of the aforesaid spring. In the event of a fall, the D-ring swings suddenly downwardly about the pivot points 28 and carries with it the locking member 27 thereby releasing the ball cage 21 so that the internal spring forces this cage into cable-gripping position.

The runner shown in FIGURE 6 is similar to that shown in FIGURES 1 and 2 save in that at the top of the runner a cap 29 is provided which has an internal tubular stem portion 29a which forms a cable guide at the upper part of the runner. The cap 29 is urged upwardly into its illustrated position, in which a flared bottom end of the stem 29a bears against wedge member 10, by a compression spring 30. The wedge member 10 extends upwardly from the top of the body portion 2 so as to intrude within a skirt portion of the cap 29. This feature assists in preventing access of water to the interior of the runner. A weather seal may if desired be provided at the top of the cap 29, e.g., in the form of a rubber ring surrounding the cable 1.

If the user at any time wishes to render the unit temporarily inoperative, he can hold the cap 29 depressed against the spring 30 and thereby prevent displacement of the weight 8 due to inertia.

In devices operating like those illustrated in FIGURES 1 to 3 and 6 the mass of the weight 8 can be selected so that the locking takes place only in the event of a very rapid downward acceleration of the body of the runner and not in the event of such abrupt downward movements as will sometimes occur as a result of ordinary movements of the person attached to the runner ring 17, e.g., while he is working or ascending or descending a ladder.

The greater importance is attached to the embodiments of the invention which operate on the inertia principle. An important feature of all of the illustrated embodiments which adopt this feature is the fact that the actuating mechanism, i.e. the balls, the wedge means and the mass which by its inertia causes the balls to be cammed against the safety line, are enclosed in the body of the runner where the mechanism is substantially sealed against the entry of foreign bodies which might interfere with the operation of the mechanism. This enclosure of the mechanism is made possible by the fact that its operation does not require any part of the mechanism to extend through the body or casing of the runner for actuation of the mechanism from outside. The runner can have a substantially uninterrupted exterior and can be quite slim, e.g. in the general form of a cylinder about 1½–2″ in diameter. The movements of such a runner are not likely to be checked by abutment with parts of a structure when used on a freely suspended safety line and the upward tapering of the top of the runner shown in FIGURES 1 and 2 further helps to this end.

What we claim is:

1. A mobile safety anchor for use by workers at height, comprising a runner having a tubular body defining an internal through passage for a safety line and means connected to and contacting said tubular body only for coupling such body to a safety belt, said runner housing a weight which is movable axially within said body, a series of balls held within said body in positions spaced angularly around said passage and adjacent to said weight, wedge means operative in the course of movement of said weight in one direction relative to said body to displace said balls radially inwardly for gripping a safety line when threaded through said runner, and resilient means supporting the weight in a position in which said series of balls is out of gripping engagement with said line but in close proximity thereto, the weight being freely movable axially against gravity to cause inward movement of said balls by engagement with said wedge means in the event of rapid axial acceleration of said body from rest in one direction.

2. The mobile safety anchor of claim 1 wherein said series of balls are held within said body by said weight.

3. The mobile safety anchor of claim 1 and including a cage means for holding said series of balls within said tubular body.

4. The mobile safety anchor of claim 1 wherein said series of balls are held within said body by a cage means which is separate from said weight.

5. A mobile safety anchor for use by workers at a height, comprising a runner having a tubular body defining an internal through passage for a safety line and means connected to and contacting said tubular body only for coupling the body to a safety belt, said runner housing an inertia means which is movable axially within said body, a series of balls held within said body in positions spaced angularly around said passage and around a safety line passing therethrough, a wedge means operative to displace said balls radially inwardly for gripping the safety line which is threaded through said runner, said inertia means being mounted within said body in a position with respect to said wedge means to normally maintain said series of balls out of gripping engagement with said line but in close proximity thereto when said device is held in a substantially vertical position with the inertia means generally below said series of balls, said inertia means being freely movable axially against gravity by inertia to cause inward movement of said balls by an engagement with said wedge means in the event of a rapid axial acceleration of said body from rest in one direction.

6. The mobile safety anchor of claim 5 and including resilient means for mounting said inertia means within said body, said resilient means functioning to assist in the movement of said inertia means to cause an engagement of said balls with said wedge means upon rapid axial acceleration of the body in one direction.

References Cited

UNITED STATES PATENTS

| | | | |
|---|---|---|---|
| 1,234,435 | 7/1917 | Wood. | |
| 1,705,167 | 3/1929 | Yannetta. | |
| 1,829,760 | 11/1931 | Santiago. | |
| 2,071,903 | 2/1937 | Shively | 297—386 X |
| 2,161,703 | 6/1939 | Ellis. | |
| 3,177,543 | 4/1965 | Fountain | 182—5 |
| 3,237,729 | 3/1966 | Proctor | 297—386 X |

BERNARD A. GELAK, *Primary Examiner.*

REINALDO P. MACHADO, *Examiner.*